United States Patent

Rolt

(10) Patent No.: US 7,716,913 B2
(45) Date of Patent: May 18, 2010

(54) ENGINE

(75) Inventor: Andrew M Rolt, Derby (GB)

(73) Assignee: Rolls-Royce PLC, London (GB)

( * ) Notice: Subject to any disclaimer, the term of this patent is extended or adjusted under 35 U.S.C. 154(b) by 932 days.

(21) Appl. No.: 11/088,987

(22) Filed: Mar. 24, 2005

(65) Prior Publication Data

US 2005/0268612 A1    Dec. 8, 2005

(30) Foreign Application Priority Data

Apr. 24, 2004  (GB) ................. 0409203.7

(51) Int. Cl.
*F02K 99/00* (2009.01)

(52) U.S. Cl. ......................... 60/266; 60/226.1

(58) Field of Classification Search .................. 60/723, 60/226.1, 200.1, 266, 728; 123/563; 180/68.3; 244/57, 130, 117 A, 53 R, 53 B
See application file for complete search history.

(56) References Cited

U.S. PATENT DOCUMENTS

| | | | | |
|---|---|---|---|---|
| 2,373,139 A | * | 4/1945 | Morris | 60/602 |
| 3,751,909 A | | 8/1973 | Kohler | |
| 4,254,618 A | * | 3/1981 | Elovic | 60/226.1 |
| 4,474,001 A | * | 10/1984 | Griffin et al. | 60/204 |
| 4,914,904 A | * | 4/1990 | Parnes et al. | 60/226.1 |
| 5,038,560 A | | 8/1991 | Seed | |
| 5,123,242 A | * | 6/1992 | Miller | 60/226.1 |
| 5,149,018 A | * | 9/1992 | Clark | 244/117 A |
| 5,182,904 A | | 2/1993 | Coplin | |
| 5,351,476 A | * | 10/1994 | Laborie et al. | 60/785 |
| 5,414,992 A | * | 5/1995 | Glickstein | 60/782 |
| 5,522,217 A | | 6/1996 | Zauner | |
| 5,782,077 A | * | 7/1998 | Porte | 60/782 |
| 5,941,061 A | * | 8/1999 | Sherry et al. | 60/798 |
| 6,134,880 A | * | 10/2000 | Yoshinaka | 60/226.1 |
| 6,250,061 B1 | * | 6/2001 | Orlando | 60/772 |
| 6,584,778 B1 | * | 7/2003 | Griffiths et al. | 60/782 |
| 6,736,354 B2 | * | 5/2004 | Goto et al. | 244/135 C |
| 6,931,834 B2 | * | 8/2005 | Jones | 60/226.1 |

FOREIGN PATENT DOCUMENTS

EP          0 959 230 A3    11/1999

* cited by examiner

*Primary Examiner*—Michael Cuff
*Assistant Examiner*—Phutthiwat Wongwian
(74) *Attorney, Agent, or Firm*—Oliff & Berridge, PLC

(57) ABSTRACT

An engine (110, 210) for moving a conveyance (132) through a fluid includes first and second pressure creating means (13, 14) for pressurising an engine airflow, and intercooling means (116, 290, 292) for cooling the engine airflow between the first and second pressure creating means (13, 14). The intercooling means (116, 290, 292) includes a heat exchanger (116) which is arranged to be cooled by a flow of the fluid generated by the relative movement of the conveyance (132) through the fluid.

33 Claims, 4 Drawing Sheets

ENGINE

The present invention relates to engines, particularly but not exclusively engines for moving conveyances through fluids.

Conventionally, in a gas turbine engine, an engine airflow enters an air intake and is compressed by, in series, a first pressure compressor and a second pressure compressor before entering a combustor. It is known to provide intercooling means between the first pressure compressor and the second pressure compressor. In marine applications, water is used as a coolant. In aero engines, it is known to provide a heat exchanger which utilises a bypass airflow generated by a propulsive fan to cool the engine airflow between the first pressure compressor and the second pressure compressor. Such intercooling reduces the work input required at the second pressure compressor, or allows a higher compressor delivery pressure than would otherwise be possible given material temperature constraints, thus increasing engine thrust available. Such intercooling can improve engine fuel economy, but the pressure losses associated with the intercooler heat exchanger on both the core engine airflow side and the bypass airflow side detract from this performance improvement.

An alternative intercooling means uses engine fuel as a coolant, heating the fuel by heat exchange with the engine airflow before the fuel enters the combustion chamber. However, kerosene, the generally used aviation fuel, has a limited thermal capacity, which in the quantities normally available severely limits the amount of intercooling which can be achieved by this means.

According to the present invention, there is provided an engine for moving a conveyance through a fluid, the engine including first and second pressure creating means for pressurizing an engine airflow, and intercooling means for cooling the engine airflow between the first and second pressure creating means, the intercooling means including a heat exchanger, the heat exchanger arranged to be cooled by a flow of the fluid generated by the relative movement of the conveyance through the fluid.

Preferably, the heat exchanger is arranged to reduce the frictional drag of the conveyance moving through the fluid. Preferably, the heat exchanger heats the flow of fluid to reduce the frictional drag.

The heat exchanger may be mounted on or may form part of an external surface of the conveyance, and preferably may form a structural part of the conveyance.

The heat exchanger may be selectively operable, and may be arranged so that the cooling effect is controllable, and desirably is controllable in accordance with the operating conditions of the engine.

The intercooling means may include a plurality of said heat exchangers, which may be mounted on or may form part of a plurality of the external surfaces of the conveyance.

Preferably, the fluid is air. Preferably, the conveyance is an aircraft. Preferably, the engine is a gas turbine. Preferably, the external surface includes any of a group including the surfaces of a nacelle, a pylon, a wing and a fuselage.

The said heat exchanger may comprise a plurality of spaced walls, and the spaced walls may define an airflow passage therebetween. Preferably, one of the spaced walls forms the part of the external surface. Preferably, the said heat exchanger includes fin members extending between one wall and an opposite wall.

Preferably, the said heat exchanger is arranged so that the engine airflow through the said heat exchanger is generally across or counter to the fluid flow.

The said heat exchanger may be pivotally mounted, and may form part of an access cover or door.

The intercooling means may include a second heat exchanger, which may be arranged to be cooled by engine fuel. Return means may be provided to return the engine fuel to a storage tank. The return means may be arranged so that the engine fuel heats at least part of the external surface to reduce frictional drag. The second heat exchanger may be arranged in flow series or flow parallel with the said heat exchanger, and may be selectively operable.

The engine may include a propulsive fan which generates a flow of bypass air, and the intercooling means may include a third heat exchanger, which may be arranged to be cooled by the flow of bypass air generated by the propulsive fan. The third heat exchanger may be arranged in flow series or flow parallel with the said heat exchanger, and may be arranged in flow series or flow parallel with the second heat exchanger, and may be selectively operable.

Preferably, the engine is an engine optimised for supersonic flight.

Further according to the present invention, there is provided an aircraft including a gas turbine engine as set out above.

Still further according to the present invention, there is provided a heat exchanger for a gas turbine engine as set out above.

Embodiments of the present invention will now be described, by way of example only, and with reference to the accompanying drawings, in which:—

Figure 1:
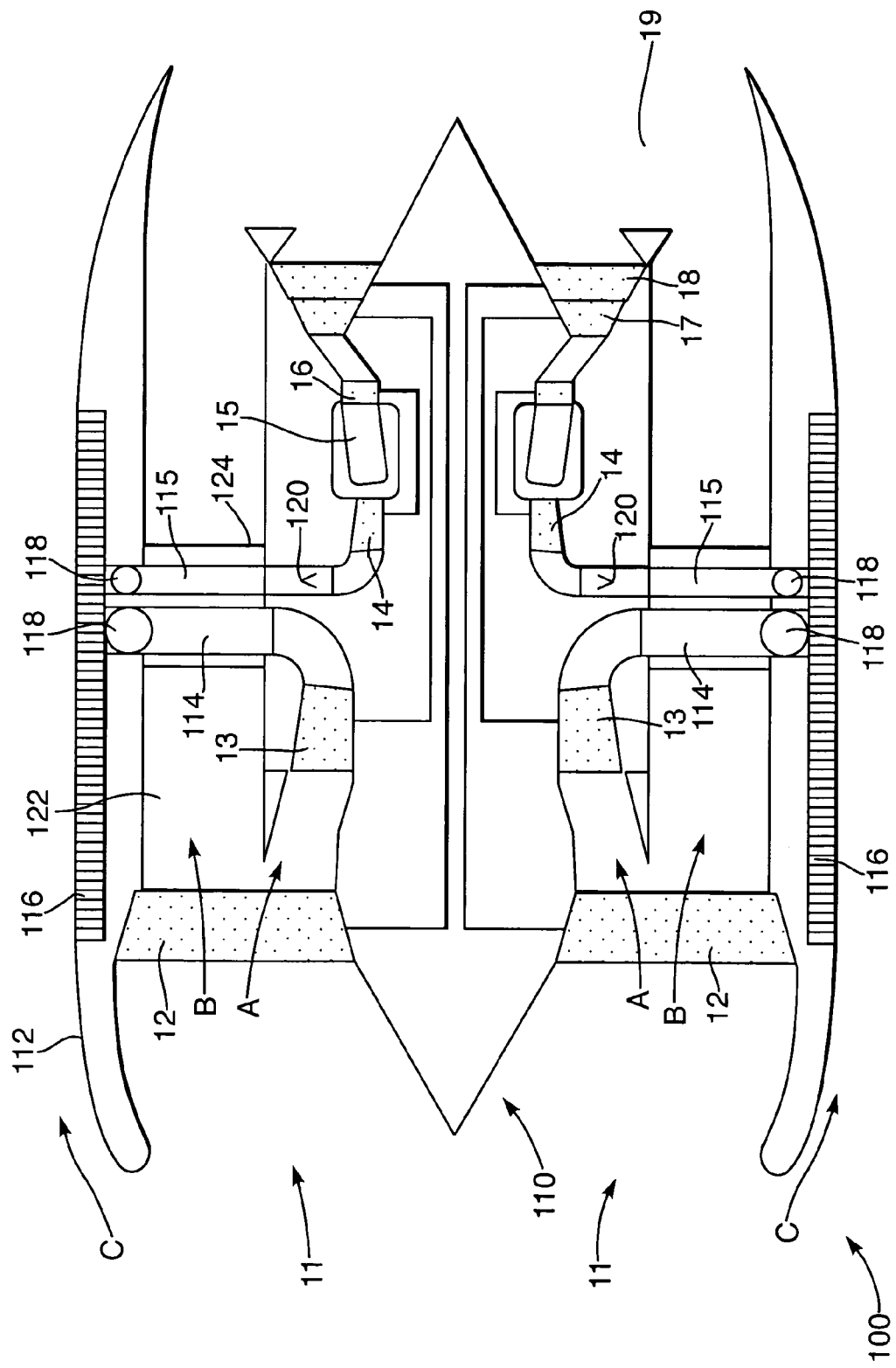
FIG. 1 is a schematic cross sectional side view of a gas turbine engine according to the invention.

FIG. 1 shows an aero engine power plant 100 including a gas turbine engine 110 located within a nacelle 112. The engine 110 is similar to a conventional gas turbine engine in comprising an air intake 11, a propulsive fan 12, a first pressure creating means in the form of an intermediate pressure compressor 13, a second pressure creating means in the form of a high pressure compressor 14, a combustor 15, a turbine arrangement comprising a high pressure turbine 16, an intermediate pressure turbine 17 and a low pressure turbine 18, and an exhaust nozzle 19.

In contrast, however, to a conventional gas turbine engine, the engine 110 according to the present invention includes intercooling means, the intercooling means including a surface heat exchanger 116 located on an external surface of the nacelle 112. Duct work 114 connects the intermediate pressure compressor 13 to the surface heat exchanger 116, and return duct work 115 connects the surface heat exchanger 116 to the high pressure compressor 14.

Couplings 118 are provided in the ductwork 114, 115 to allow some degree of relative movement between the surface heat exchanger 116 and the duct work 114, 115, and to facilitate assembly and maintenance.

The duct work 114, 115 extends across a bypass duct 122 from the engine 110 to the nacelle 112, and is encased within a shroud 124, which is designed to minimise pressure losses in the bypass duct 122.

The return duct work 115 includes non return valves 120 to protect against reverse flow through the return duct work 115 in the event of a structural failure.

Figure 2:
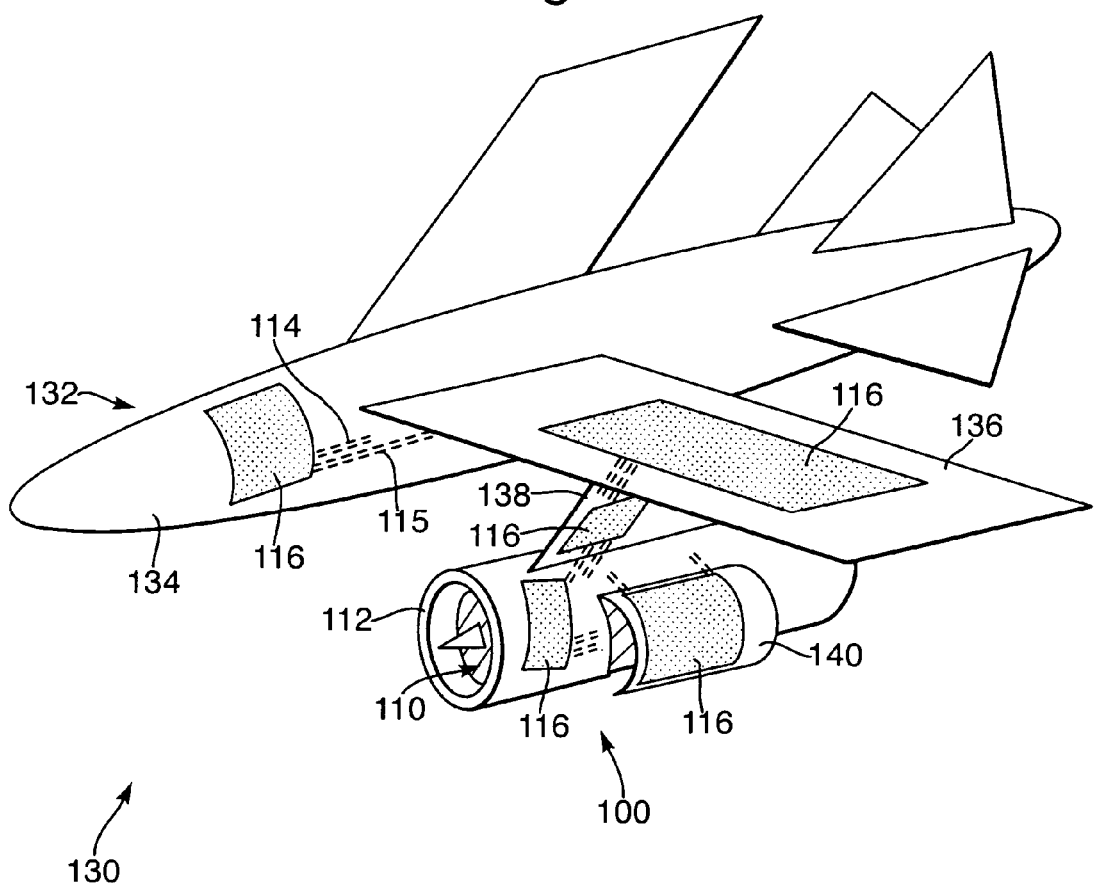
FIG. 2 is a schematic perspective view of an aircraft according to the invention.

FIG. 2 shows an aircraft 130 comprising an airframe 132, the airframe 132 comprising a fuselage 134 and wings 136. In the example shown, the power plant 100 is supported from the wing 136 by a pylon 138. The aircraft 132 includes a plurality of surface heat exchangers 116, the surface heat exchangers 116 forming part of the surface of the fuselage 134, the wing 136, the pylon 138 and the nacelle 112. The nacelle 112 includes an access door 140 which is hingedly mounted for opening, the access door 140 including a surface heat exchanger 116. The duct work 114, 115 extends between the engine 110 and the surface heat exchangers 116.

Figure 3:
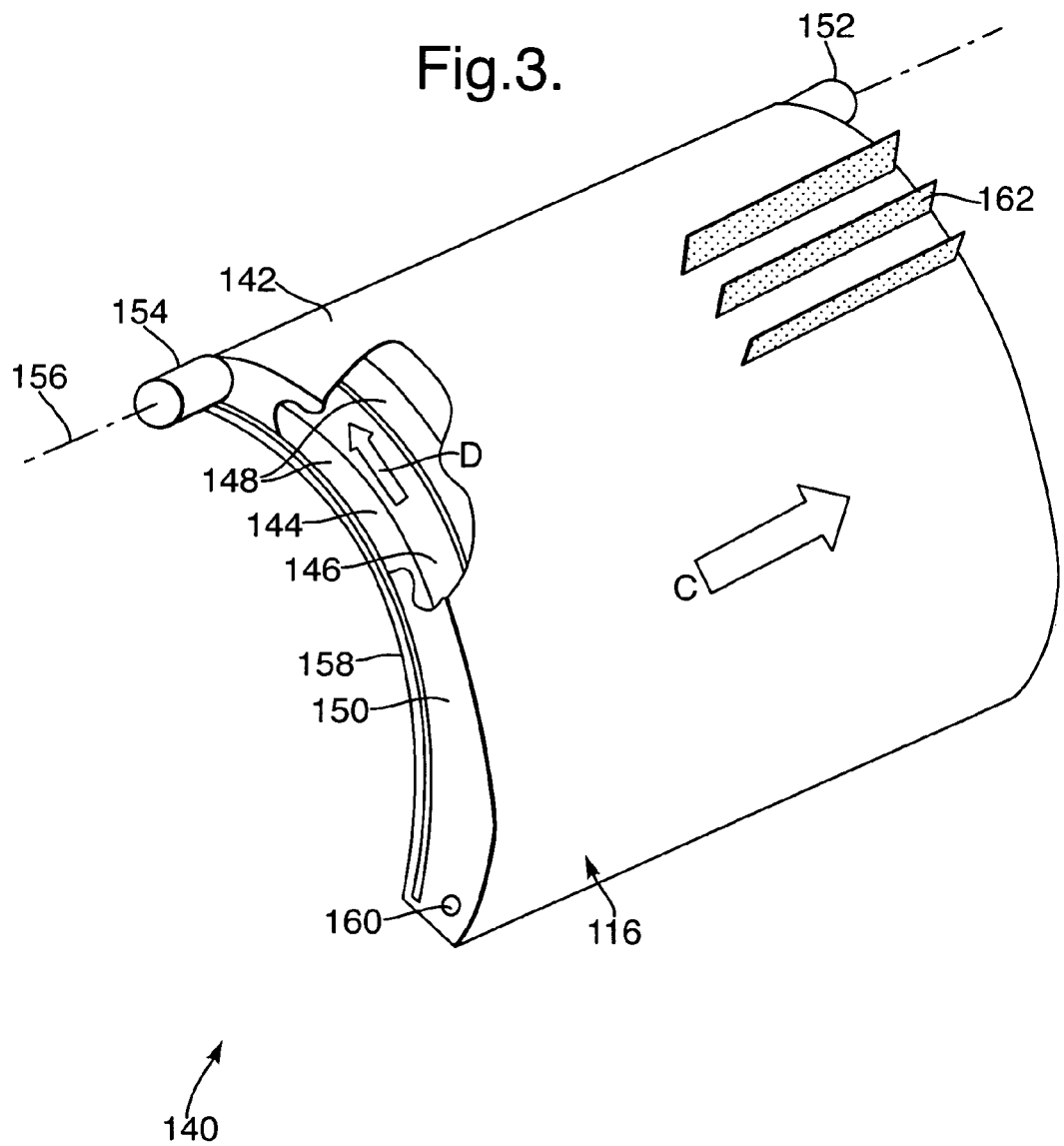
FIG. 3 is a schematic perspective view of an access door according to the invention.

FIG. 3 shows the access door 140 in more detail, as an example of the construction of the surface heat exchanger 116. The surface heat exchanger 116 comprises an outer wall 142, spaced from an inner wall 144 by side walls 150, the outer wall 142, inner wall 144 and side walls 150 together enclosing an interior therebetween. A plurality of fin members 146 extend between the outer wall 142 and inner wall 144 to define an airflow passage 148. The airflow passage 148 extends from an inlet connector 152 to an outlet connector 154. In the example of the hinged access door 140 shown in FIG. 4, the inlet and outlet connectors 152, 154 extend along a hinge axis 156. The surface heat exchanger 116 also includes an additional inner wall 158 which is formed of heat insulating material. A drain hole 160 is provided in a lower part of the access door 140 to allow any moisture present at engine shutdown to drain away. A plurality of ribs 162 extend outwardly from the outer wall 142.

In operation, air entering the intake 11 is compressed by the fan 12 which produces two airflows: a core engine airflow indicated by arrow A into the intermediate pressure compressor 13 and a bypass airflow indicated by arrow B into the bypass duct 122 which produces propulsive thrust. The core engine airflow is compressed by the intermediate pressure compressor 13, raising the temperature of the airflow. The core engine airflow passes along the duct work 114 to the surface heat exchanger 116. The core engine airflow passes through inlet connector 152 and along the airflow passages 148 to the outlet connector 154, and via the return duct work 115 to the high pressure compressor 14 and then into the combustor 15. Combustion and expansion through turbines 16, 17 and 18 is generally conventional.

The heat exchangers 116, as shown in FIG. 2, are positioned on external surfaces of the aircraft. The hot core engine airflow heats the outer wall 142 of the external heat exchangers 116, and heat transfers from the outer wall 142 to the external cooling airflow which is indicated by arrow C in FIG. 3 which is generated by the relative movement of the aircraft through the air. The surface heat exchangers 116 are positioned so that the heating effect is in the region of a turbulent boundary layer so that the heating effect reduces the frictional drag of the aircraft moving through the air.

As shown in FIG. 3, the core engine airflow as indicated by arrow D is across the external cooling airflow indicated by arrow C to allow good heat transfer. The external ribs 162 provide an increased heat exchange surface area in the external airflow indicated by arrow C to improve heat transfer. Such ribs may, in some locations, reduce drag. However, in many locations a smooth, rib free external surface is most cost effective.

Figure 4:
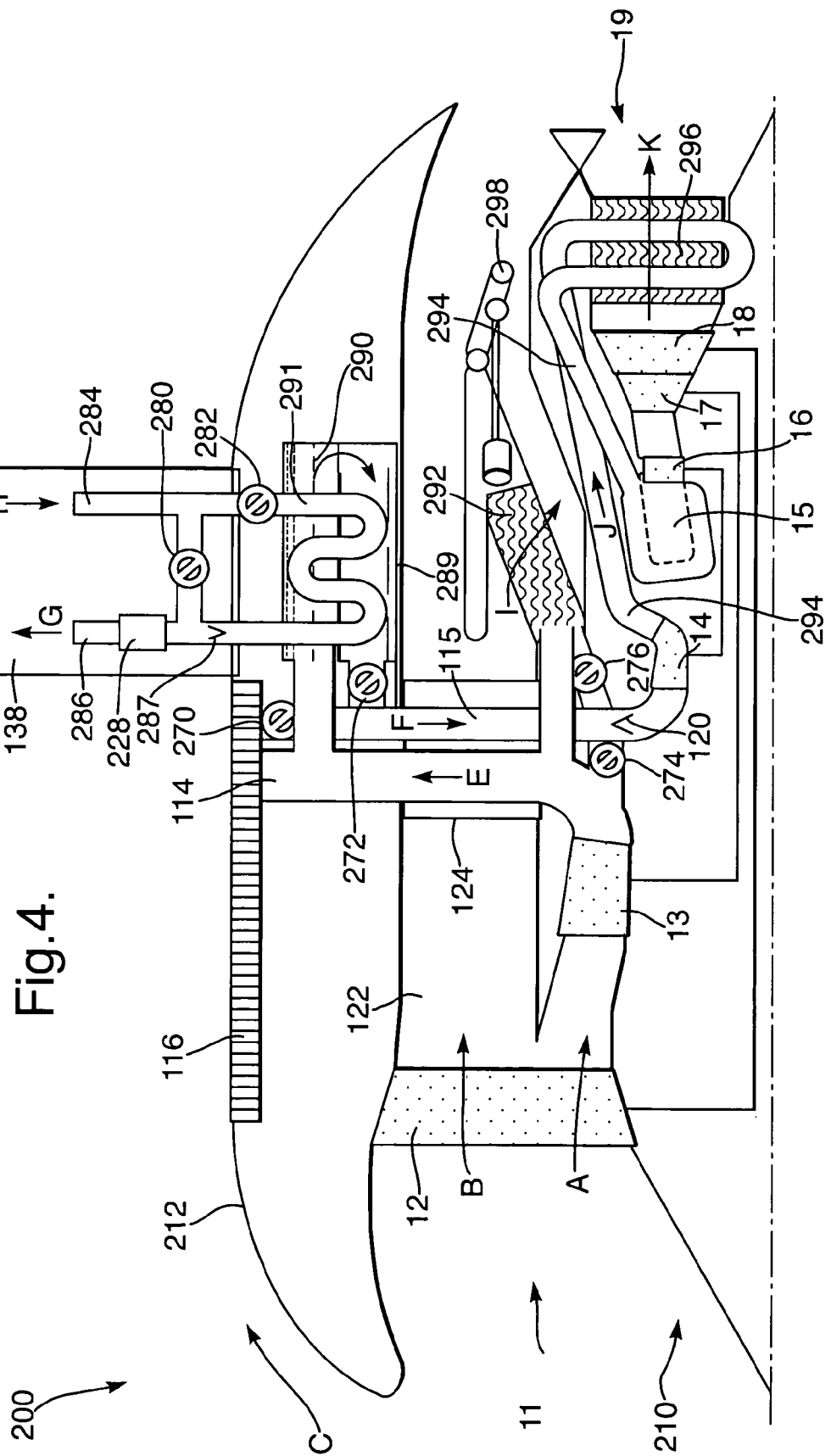
FIG. 4 is a schematic cross sectional side view of part of another gas turbine engine according to the invention.

FIG. 4 shows a further example of a gas turbine engine according to the invention, the gas turbine engine of FIG. 4 having features similar to those shown in FIGS. 1-3 and described above. Where features are the same, the same reference numerals have been retained. In FIG. 4, a power plant 200 comprises a gas turbine engine 210 located within a nacelle 212 and comprising an air intake 11, a propulsive fan 12, an intermediate pressure compressor 13, a high pressure compressor 14, a combustor 15, a turbine arrangement comprising a high pressure turbine 16, an intermediate pressure turbine 17, a low pressure turbine 18, and an exhaust nozzle 19.

The engine 210 further includes intercooling means between the intermediate pressure compressor 13 and the high pressure compressor 14, the intercooling means comprising a surface heat exchanger 116, a second heat exchanger 290 and a third heat exchanger 292 with associated outward and return duct work 114, 115.

In more detail, the outward duct work 114 conveys compressed core engine air from the intermediate pressure compressor 13 to the surface heat exchanger 116 which is the same as or similar to the surface heat exchanger previously described above. A first airflow valve 270 is provided in the return duct work 115 to allow selective operation of the surface heat exchanger 116.

The outward duct work 114 also conveys a compressed core engine airflow to the second heat exchanger 290, where heat is exchanged with a flow of aircraft fuel in pipework 291. Fuel is supplied to the pipework 291 by supply pipework 284 from fuel tanks elsewhere in the aircraft as indicated by arrow H and returned to the fuel tanks by return pipework 286 as indicated by arrow G. Fuel pump 288 is provided to move the fuel through the pipework 284, 291, 286. A supply valve 282 and bypass valve 280 allow the fuel flow to bypass the heat exchanger 290. A non-return valve 287 protects against reverse flow into the heat exchanger 290 in the event of a fuel leakage. A second airflow valve 272 allows selective operation of the second heat exchanger 290.

The intercooling means includes a third heat exchanger 292 which permits heat exchange between the engine airflow and a flow of bypass air from the bypass duct 122 as indicated by arrow I. A bypass duct valve 298 allows regulation of the bypass duct airflow through the third heat exchanger 292. A third airflow valve 276 allows selective operation of the third heat exchanger 292.

A fourth airflow valve 274 allows the core engine airflow to bypass the first, second and third heat exchangers 116, 290, 292 so that air can flow directly from the intermediate pressure compressor 13 to the high pressure compressor 14.

In the example shown in FIG. 4, the engine 210 includes a recuperator 296 located in flow series between the high pressure compressor 14 and the combustor 15. Duct work 294 conveys the core engine airflow from the high pressure compressor 14 as indicated by arrow J through the exhaust airflow from the low pressure turbine 18 as indicated by arrow K and then to the combustor 15.

In use, air entering the intake 11 is accelerated by the fan 12 which produces the two airflows: the core engine airflow indicated by arrow A into the intermediate pressure compressor 13 and the bypass airflow indicated by arrow B along the bypass duct 122 which provides propulsive thrust. The intermediate pressure compressor 13 compresses the airflow directed into it. From the intermediate pressure compressor 13, the compressed core engine airflow can be selectively directed to either the first heat exchanger 116, the second heat exchanger 290 or the third heat exchanger 292, either singly or in combination, by operation of the first airflow valve 270, the second airflow valve 272, the third airflow valve 276, or the core engine airflow can be directed straight to the high pressure compressor 14, bypassing the first, second and third heat exchangers 116, 290, 292 through the fourth airflow valve 274.

The arrangement of the first, second and third heat exchangers 116, 290, 292 allows flexibility so that optimum intercooling can be maintained under different operating conditions. For example, for a turbo fan engine optimised for supersonic cruise conditions, the highest cycle temperatures tend to occur at the supersonic cruise condition. At this condition, the surface heat exchangers 116 have relatively high external heat transfer coefficients because of the high external cooling airflow velocities thus maximising the cooling effect achievable. Airframe drag reduction is also desirable at transonic and supersonic conditions and the effect of the heated external surfaces in reducing drag is also maximised at these conditions. Thus the invention is particularly suitable for use in supersonic flight. At high power and lower airspeed conditions, such as take-off, the reduced external air velocity means that the surface heat exchangers 116 are less effective, and the second and third heat exchangers 290, 292 can be used to supplement the surface heat exchangers 116.

First, second and third heat exchangers 116, 290, 292 are shown in FIG. 4 arranged in parallel, which arrangement minimises pressure losses in the core engine airflow. The use of the surface heat exchangers 116 supplemented by the second and third heat exchangers allows the second and third heat exchangers to be designed for relatively low heat transfer and moderately high pressure losses at full power conditions, so that they can be made smaller and lighter and with less expense than would have been the case if they had been the primary heat exchangers in an intercooled engine.

The most advantageous locations for the surface heat exchangers 116 are those closest to the engine, as these allow the use of the shortest, lightest and least expensive ductwork 114, 115. The nacelle 212 is the first choice because of its proximity to the engine 210. If the surface heat exchangers 116 are located only on the nacelle 212, the complexity of the interface between the power plant 200 and the pylon 138, the wing 136 and the fuselage 134 is minimised, but the cooling effect provided by the surface heat exchangers 116 located only on the nacelle 212 may not be sufficient.

The surface heat exchangers 116 are advantageously located close to the leading edges of the nacelle 212, the pylon 138, the wing 136 or the airframe 132, in regions where the external cooling airflow as indicated by arrow C is already turbulent. In these regions, the local Reynolds number is lower, giving higher heat transfer coefficients and thus a larger cooling effect for a given surface area of the surface heat exchanger 116. The heating effect of the surface heat exchangers 116 in reducing friction drag continues downstream of the location of the surface heat exchangers 116, and thus it is advantageous for the surface heat exchangers 116 to be located towards the leading edges.

Various modifications may be made without departing from the scope of the invention. While the engines shown in FIGS. 1 and 4 are turbo fan engines, any suitable type of engine, such as a turbojet, a turboprop or a propfan, could be used. Any suitable number of surface heat exchangers could be used, which could be mounted on or form part of any suitable external surface of the aircraft. The surface heat exchanger could be of any suitable construction, and could be configured in any suitable configuration with the second and third heat exchangers. For instance, the first, second and third heat exchangers could be arranged in series, in parallel, or any suitable combination thereof. The configurations could be selectable depending on the operating conditions. If, for instance, either the second or third heat exchanger comes before the surface heat exchanger in flow series, higher overall effectiveness may be achieved, since the external cooling air is generally cooler than either the fuel or the bypass duct air. Alternatively, if the surface heat exchanger is arranged first in the flow series, the aircraft drag reduction could be higher because of the resulting greater external air temperature increase achieved.

The second heat exchanger could be located within, or adjacent to the aircraft fuel tanks, avoiding the need to pump large quantities of fuel around the airframe. The second heat exchanger could be provided with an over abundance of fuel, in excess of that required for combustion within the engine, or alternatively could be used to preheat fuel which is then fed directly into the combustor 15. If the fuel is recirculated back to the fuel tanks, a return means could be provided which is arranged so that the returning engine fuel heats at least part of the external surface to reduce drag in flight. The fuel tanks could be heated by the returning fuel and could be arranged to be in thermal contact with the external surface of the wing or other external surface part of the aircraft to again reduce frictional drag.

The ductwork could be incorporated into static structures already existing in the bypass duct 122 of the engine to minimise pressure losses in the bypass duct 122.

There is thus provided a gas turbine engine having improved thermal efficiency by virtue of the intercooling means. The surface heat exchangers provide intercooling with minimised pressure loss in either the core engine airflow or the bypass airflow. The surface heat exchangers are cooled by an airflow remote from the engine and so are inherently more effective than, for instance, surface heat exchangers located in the bypass duct, where the air is warmed by the compression of the fan 12 and the proximity of the engine. The external airflow over the aircraft surfaces is warmed by the surface heat exchangers so that frictional drag is reduced, which is equivalent to a further improvement in the efficiency of the engine.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An engine for moving a conveyance through a fluid, the engine comprising:
    a gas turbine including first and second compressors for pressurizing an engine airflow;
    the first compressor supplying the engine airflow to an intercooler for cooling the engine airflow between the first and second compressors, and the intercooler supplying the engine airflow to the second compressor;
    the intercooler including a heat exchanger, the heat exchanger mounted on or forming part of an external surface of the conveyance and the heat exchanger is arranged to cool the engine airflow by a flow of the fluid through which the conveyance moves, the flow of the fluid generated by the relative movement of the conveyance through the fluid.

2. An engine according to claim 1, characterised in that the heat exchanger is arranged to reduce the frictional drag of the conveyance moving through the fluid.

3. An engine according to claim 2, characterised in that the heat exchanger heats the flow of fluid to reduce the frictional drag.

4. An engine according to claim 1, characterised in that the heat exchanger forms a structural part of the conveyance.

5. An engine according to claim 1, characterised in that the heat exchange is selectively operable.

6. An engine according to claim 5, characterised in that the heat exchanger is arranged so that the cooling effect is controllable.

7. An engine according to claim 6, characterised in that the cooling effect is controllable in accordance with the operating conditions of the engine.

8. An engine according to claim 1, characterised in that the intercooling means includes a plurality of said heat exchangers.

9. An engine according to claim 8, characterised in that said heat exchangers are mounted on or form part of a plurality of the external surfaces of the conveyance.

10. An engine according to claim 1, characterised in that the fluid is air.

11. An engine according to claim 1, characterised in that the conveyance is an aircraft.

12. An engine according to claim 1, characterised in that the external surface includes any of a group including the surfaces of a nacelle, a pylon, a wing and a fuselage.

13. An engine according to claim 1, characterised in that said heat exchanger comprises a plurality of spaced walls.

14. An engine according to claim 13, characterised in that the spaced walls define an airflow passage therebetween.

15. An engine according to claim 13, characterised in that one of the spaced walls forms part of an external surface of the conveyance.

16. An engine according to claim 13, characterised in that said heat exchanger includes fin members extending between one wall and an opposite wall.

17. An engine according to claim 1, characterised in that said heat exchanger is arranged so that the engine airflow through said heat exchanger is generally across or counter to the fluid flow.

18. An engine according to claim 1, characterised in that said heat exchanger is pivotally mounted.

19. An engine according to claim 18, characterised in that the heat exchanger forms part of an access cover or door.

20. An engine according to claim 1, characterised in that the intercooling means includes a second heat exchanger.

21. An engine according to claim 20, characterised in that the second heat exchanger is arranged to be cooled by engine fuel.

22. An engine according to claim 21, characterised in that return means are provided to return the engine fuel to a storage tank.

23. An engine according to claim 22, characterised in that the return means are arranged so that the engine fuel heats at least a part of the external surface to reduce frictional drag.

24. An engine according to claim 20, characterised in that the second heat exchanger is arranged in flow series or flow parallel with said heat exchanger.

25. An engine according to claim 20, characterised in that the second heat exchanger is selectively operable.

26. An engine according to claim 1, characterised in that the engine includes a propulsive fan which generates a flow of bypass air.

27. An engine according to claim 1, characterised in that the intercooling means includes a third heat exchanger.

28. An engine according to claim 26, characterised in that the intercooling means includes a third heat exchanger, the third heat exchanger is arranged to be cooled by the flow of bypass air generated by the propulsive fan.

29. An engine according to claim 27, characterised in that the third heat exchanger is arranged in flow series or flow parallel with said heat exchanger.

30. An engine according to claim 27, characterised in that third heat exchanger is arranged in flow series or flow parallel with the second heat exchanger.

31. An engine according to claim 27, characterised in that the third heat exchanger is selectively operable.

32. An engine according to claim 1, characterised in that the engine is an engine optimised for supersonic flight.

33. An aircraft including engine according to claim 1.

* * * * *